United States Patent
Hasegawa et al.

[11] Patent Number: 5,920,324
[45] Date of Patent: Jul. 6, 1999

[54] CHARACTER PATTERN PRODUCING APPARATUS CAPABLE OF PRODUCING CHARACTER PATTERN HAVING CONNECTED CHARACTER ELEMENTS

[75] Inventors: Susumu Hasegawa, Osaka; Yuka Yabuuchi, Nara; Masayuki Fujisawa, Osaka, all of Japan

[73] Assignee: Sharp Kabushiki Kaisha, Osaka, Japan

[21] Appl. No.: 08/823,548

[22] Filed: Mar. 25, 1997

[30] Foreign Application Priority Data

Mar. 25, 1996 [JP] Japan .................. 8-068059

[51] Int. Cl.$^6$ .................................... G06F 3/14
[52] U.S. Cl. ............................. 345/467; 345/471
[58] Field of Search ............................ 345/467, 468, 345/469, 470, 471, 144, 124, 128, 141, 142

[56] References Cited

U.S. PATENT DOCUMENTS

| | | | |
|---|---|---|---|
| 4,748,443 | 5/1988 | Uehara et al. | 345/142 |
| 4,897,638 | 1/1990 | Kokunishi et al. | 345/142 |
| 4,931,953 | 6/1990 | Uehara et al. | 345/467 |
| 5,295,238 | 3/1994 | Dickson | 345/461 |
| 5,468,077 | 11/1995 | Motokado et al. | 400/76 |
| 5,579,416 | 11/1996 | Shibuya et al. | 382/293 |
| 5,715,473 | 2/1998 | Reed | 707/542 |

FOREIGN PATENT DOCUMENTS 62-9388 of 1987 Japan .
2-36955 of 1990 Japan .

*Primary Examiner*—Stephen S. Hong
*Attorney, Agent, or Firm*—Nixon & Vanderhye PC

[57] ABSTRACT

The storing portion stores character skeleton form information indicating a skeleton form shared between a plurality of fonts for the elements of a corresponding character, element contour shape information indicating the contour shapes of elements for each font, and element skeleton form information indicating the skeleton forms of elements for each font. The determination portion determines whether or not a element corresponding to a font code and a character code input by the input portion is to be subjected to a cursive processing with another element. The first modification portion modifies information indicating the skeleton form of a set of elements to be processed corresponding to the prescribed font into a processable form. The second modification portion modifies the element skeleton form information of the set of elements based on information indicating the modified skeleton forms. The third modification portion modifies the element contour shape information of the set of elements based on the element skeleton form information modified by the second modification portion. The connection portion connects the contour shapes of the set of elements based on the element contour shape information modified by the third modification portion. The pattern producing portion produces a character pattern, using element contour shape information corresponding to the connected contour shapes.

17 Claims, 13 Drawing Sheets

CHARACTER PATTERN PRODUCING APPARATUS CAPABLE OF PRODUCING CHARACTER PATTERN HAVING CONNECTED CHARACTER ELEMENTS

BACKGROUND OF THE INVENTION

1. Field of the Invention

The present invention relates to a character pattern producing apparatus for producing a cursive character pattern while indicating a character by its outline font.

2. Description of the Background Art

Conventional character pattern producing apparatuses are disclosed by Japanese Patent Publication No. 2-36955 or Japanese Patent Laying-Open No. 62-9388. According to methods employed by these apparatuses, character shape information representing character shapes are stored, whether or not to form two adjacent characters in a cursive style is determined, and the character shape information of these two characters are combined if they are to be formed into a cursive style for producing a character pattern including connected characters.

Such a method of producing a character pattern as disclosed by these two documents enables cursive character determination only about two adjacent characters, and a cursive processing between elements included in a single character is not possible.

There is also a method of retaining character shape information representing the contour shape of a character as coordinates of skeleton points representing the skeleton form of the character and single line width parameter at each skeleton point in order to perform a cursive character processing of characters. According to the method, however, restrictions in terms of shape are imposed in designing character shapes, and a font cannot be freely designed.

SUMMARY OF THE INVENTION

It is therefore an object of the invention to provide a character pattern producing apparatus capable of producing a high definition font, which enables a cursive processing between elements in a single character, and a recording medium storing a program which permits such a method to be implemented by a computer.

Another object of the invention is to provide a character pattern producing apparatus capable of producing a high definition font permitting a cursive processing between elements in a single character and without designing restrictions, and a recording medium storing a program permitting such a method to be implemented by a computer.

A character pattern producing apparatus according to the present invention which produces and outputs a character pattern according to a prescribed font for a character formed of one or more elements includes a storing portion, an input portion, a determination portion, a first modification portion, a second modification portion, a third modification portion, a connection portion, and a pattern producing portion.

The storing portion prestores, for each character code and for each element of a corresponding character, character skeleton form information representing skeleton forms which can be shared between a plurality of fonts, element contour shape information representing the contour forms of elements for each font, and element skeleton form information representing the skeleton forms of elements for each font. A prescribed font and one or more character codes are input from the input portion.

The determination portion determines whether or not to perform a cursive processing to each element corresponding to the prescribed font and the character code input by the input portion with another element. The first modification portion modifies information representing the skeleton forms of a set of elements to be processed corresponding to the prescribed font into a form possible for cursive processing in response to a determination by the first modification portion to perform a cursive processing.

The second modification portion modifies the element skeleton form information of the set of elements based on the information representing the skeleton forms modified by the first modification portion. The third modification portion modifies the element contour shape information of the set of elements based on the element skeleton form information modified by the second modification portion.

The connection portion connects the contour shapes of the set of elements based on the element contour shape information modified by the third modification portion, and the pattern producing portion produces a character pattern using element contour shape information corresponding to the connected contour shapes.

In operation, if the determination portion determines that one element of a character is to be subjected to a cursive processing with another element, the first to third modification portions and connection portion connect the contour shapes of the set of elements to be processed according to a prescribed font so that they can be subjected to a cursive processing, and the contour shapes connected by the pattern producing portion are produced into a character pattern.

Since the character pattern producing apparatus enables a cursive character processing not only between a plurality of characters but also between elements in a single character, more practical and varied fonts as if written by a person using a brush can be produced. Moreover, a variety of character patterns can be produced simply by modifying element contour shape information representing the contours of elements and a font can be developed using fewer person-hours.

In addition, since the contour of a character is produced based on the contour shape information of corresponding elements to a prescribed font, restrictions in shape in designing fonts do not exist and free designing of fonts is not impeded as compared to the conventional method of retaining the coordinates of skeleton points representing the skeleton form of a character and a single line width parameter at each skeleton point.

The character skeleton form information may include cursive character determination information indicating whether or not a corresponding element is to be subjected to a cursive processing and cursive character attribute information necessary for modifying skeleton forms. The determination portion can readily determine whether or not to perform a cursive processing corresponding to the font based on the cursive character determination information in the character skeleton form information. The first modification portion can modify a skeleton form into a form possible for cursive processing using the cursive character attribute information.

According to another aspect of the invention, the recording medium stores a program implemented by a computer including an input device and a storing device which prestores character skeleton form information prepared for each character code, element contour shape information prepared for each font and for each element used in the font, and element skeleton form information prepared for each font and for each element used in the font. The character skeleton form information indicates skeleton forms shared between a plurality of fonts for all the elements of a corresponding character, the element contour shapes indicates the contour shapes of elements, and the element skeleton form information indicate the skeleton form of a corresponding element. The program implements through computer processing a method of producing a character pattern including the steps of determining whether or not elements corresponding to a prescribed font and a character code input through the input device are to be subjected to a cursive processing with another element, a first modification step of modifying information indicating the skeleton forms of a set of elements to be processed corresponding to the prescribed font into a form possible for cursive processing in response to a determination by the determination step to perform a cursive processing, a second modification step of modifying the element skeleton form information of the set of elements based on the modified information indicating the skeleton forms, a third modification step of modifying the element contour shape information of the set of elements based on the modified element skeleton form information, connecting the contour shapes of the set of elements based on the modified element contour shape information, and producing a character pattern using element contour shape information corresponding to the connected contour shapes.

The effects the same as those by the character pattern producing apparatus described above may be brought about by implementing the program recorded in the recording medium by the above computer.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Hereinafter, a character is formed of one or more elements forming each stroke of the character. Information specifying the character and the shapes of the elements includes information on a skeleton form indicating the skeleton and information on a contour shape formed by fleshing out the skeleton form.

Figure 1:
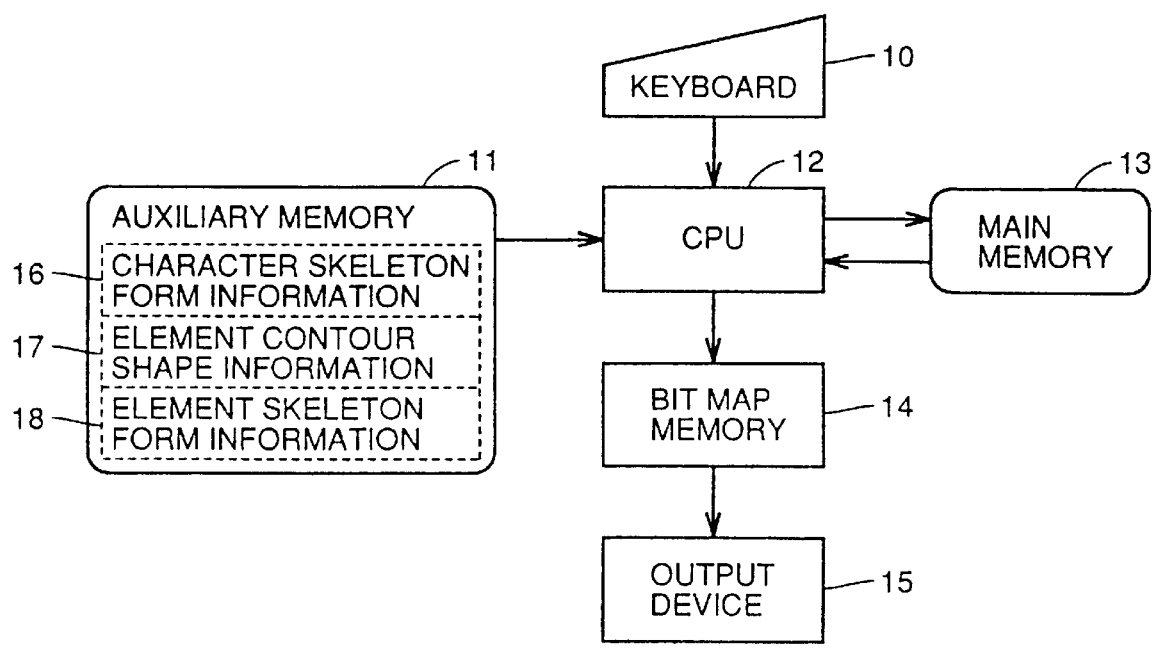
FIG. 1 is a diagram schematically showing the structure of a character pattern producing apparatus according to an embodiment of the invention.

Referring to FIG. 1, the character pattern producing apparatus according to the embodiment of the invention includes a keyboard 10, an auxiliary memory 11 for storing information on fonts, a well-known CPU (Central Processing Unit) 12, a main memory 13 connected to CPU 12, a bit map memory 14 for image display, and an output device 15 formed of a laser printer or heat-transfer printer connected to bit map memory 14. The apparatus is substantially a computer.

A font code indicating the kind of font of a character (such as Gothic type and cursive type), and the character codes of one or more characters are input from keyboard 10. Note that fonts are circulated as an article of trade, and given trade names. A font code designated here may be one to identify such a trade name. In place of or in combination with the keyboard, a pointing device such as mouse may be used for inputting.

Auxiliary memory 11 prestores character skeleton form information 16 provided for each character code, element contour shape information 17 provided for each font code, and element skeleton form information 18 provided for each font code. Character skeleton form information 16 represents skeleton forms shared between a plurality of fonts for each element of a corresponding character. Element skeleton form information 18 represents the skeleton form of an element used in a font designated by a font code. Element contour shape information 17 represents the contour shape of an element in a font designated by a font code. Although only one piece for each of such information is stored in the drawings for ease of illustration, in practice, a plurality of pieces of such information 16, 17 and 18 are stored.

CPU 12 includes the functions of modifying the skeleton form of a character, modifying the skeleton forms and contour shapes of elements, connecting the contour shapes of a set of elements, and producing a character pattern. A set of elements whose contour shapes are connected for cursive processing include two elements. One of the two elements is called "starting element" and the other "ending element". Herein, when elements are subjected to a cursive processing, they are replaced with other elements for cursive processing (hereinafter referred to as "alternative elements").

CPU 12 having a program memory and a work memory executes control for producing a character pattern based on data stored in auxiliary memory 11 and main memory 13. The character pattern is written onto bit map memory 14 and printed or displayed by output device 15.

Main memory 13 has an input buffer for temporarily storing character information read our from auxiliary memory 11, an output buffer for temporarily storing character skeleton form data, element skeleton form data, and element contour shape data which have been modified to represent shapes different from the shapes of characters represented by data originally stored as will be described later, and a storing portion storing skeleton point coordinate data for starting and ending elements for cursive processing, the skeleton forms of which have been modified to represent shapes different from the shapes of characters represented by the originally stored data.

Herein, listed as a method of storing the contour shape of a character are: (1) a method of storing the contour line of a character by linear approximation, (2) a method of storing the contour line of a character with straight lines and arcs, and (3) a method of storing the contour line of a character by straight lines and curves. In view of the definition of characters and the efficiency of data capacity, method (3) is the most appropriate for producing a character pattern. In this embodiment, the contour of a character is stored by method (3), and the data of the contour line of a character thus stored by straight lines and curves are stored in auxiliary memory 11 as contour coordinate data in element contour shape information.

Further, the embodiment employs a cubic Bézier curve during producing a continuous character contour from discrete contour coordinate data. The cubic Bézier curve is a smooth curve which can be defined by the starting point, ending point and two control points of a curve.

Now, the structure of auxiliary memory 11 will be detailed.

Figure 2:
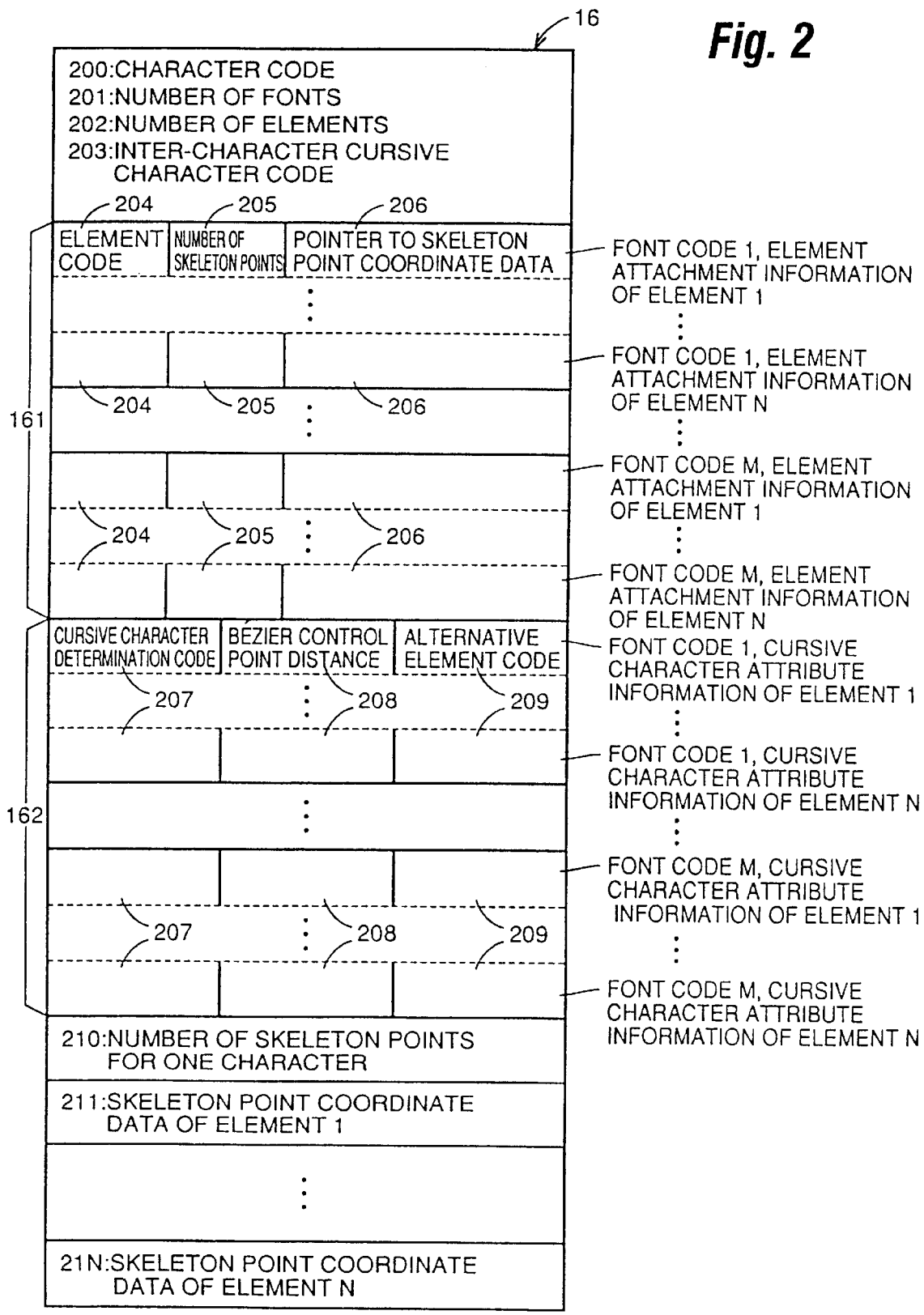
FIG. 2 shows an example of the stored content of character skeleton form information 16 in FIG. 1.

FIG. 2 shows an example of the stored content of character skeleton form information 16. A certain piece of character skeleton form information 16 includes, as its storage content, a character code 200 to identify a character, the number of kinds of fonts producible from a single piece of character skeleton form information 201 (M for example), the number of elements to form the character 202 (N for example), an inter-character cursive character code 203 indicating whether or not to perform a cursive character processing between the character of interest and characters before and after, a element attachment information group 161 indicating which shape the skeleton and contour of the element of interest should be formed into for each font and for each element of the character, a cursive character attribute information group 162 specifying the content of a cursive processing to be performed to the element for each font and for each element of the character, the number of skeleton points for a single character 210, and skeleton point coordinate data 211 to 21N corresponding to N elements included in the character.

A rule of order is determined between elements in character skeleton form information 16, and the rule of order requests that a starting element in a cursive processing, element attachment information belonging to an ending element corresponding thereto, cursive character attribute information, and the skeleton point coordinate data of the elements be stored in a continuous manner.

Element attachment information group 161 stores element attachment information as many pieces as the number produced by multiplying the number of character elements (N) by the number of producible fonts (M). Element attachment information each includes an element code 204 indicating an element contour shape corresponding to elements the number of skeleton points forming the skeleton of elements 205, and a pointer 206 to data corresponding to the element of interest among skeleton point coordinate data 211 to 21N.

Cursive attribute information group 162 stores cursive character attribute information as many pieces as the number produced by multiplying the number of character elements (N) by the number of producible fonts. The cursive attribute information each includes a cursive character determination code 207 indicating whether or not to perform a cursive processing to an element as well as whether the element is a starting element or an ending element in a cursive processing, a Bézier control point distance 208, a distance parameter used during producing a Bézier curve to define the shape of another portion to be connected with the element of interest, and an alternative element code 209 specifying an alternative element to be used in place of the element corresponding to element code 204 in the cursive processing.

Figure 3:
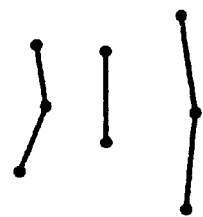
FIG. 3 shows an example of the geometric information of the character skeleton form information for two characters input through the keyboard in FIG. 1.
Figure 3:
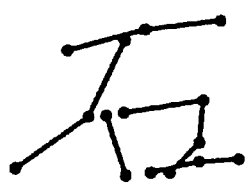

FIG. 3 shows an example of the geometric information of character skeleton form information for two characters input from keyboard 10. In this example, character codes (herein based on JIS graphic character code (Kuten)), No. 3278 "川" and No. 3248 "玉" are specified.

Figure 4:
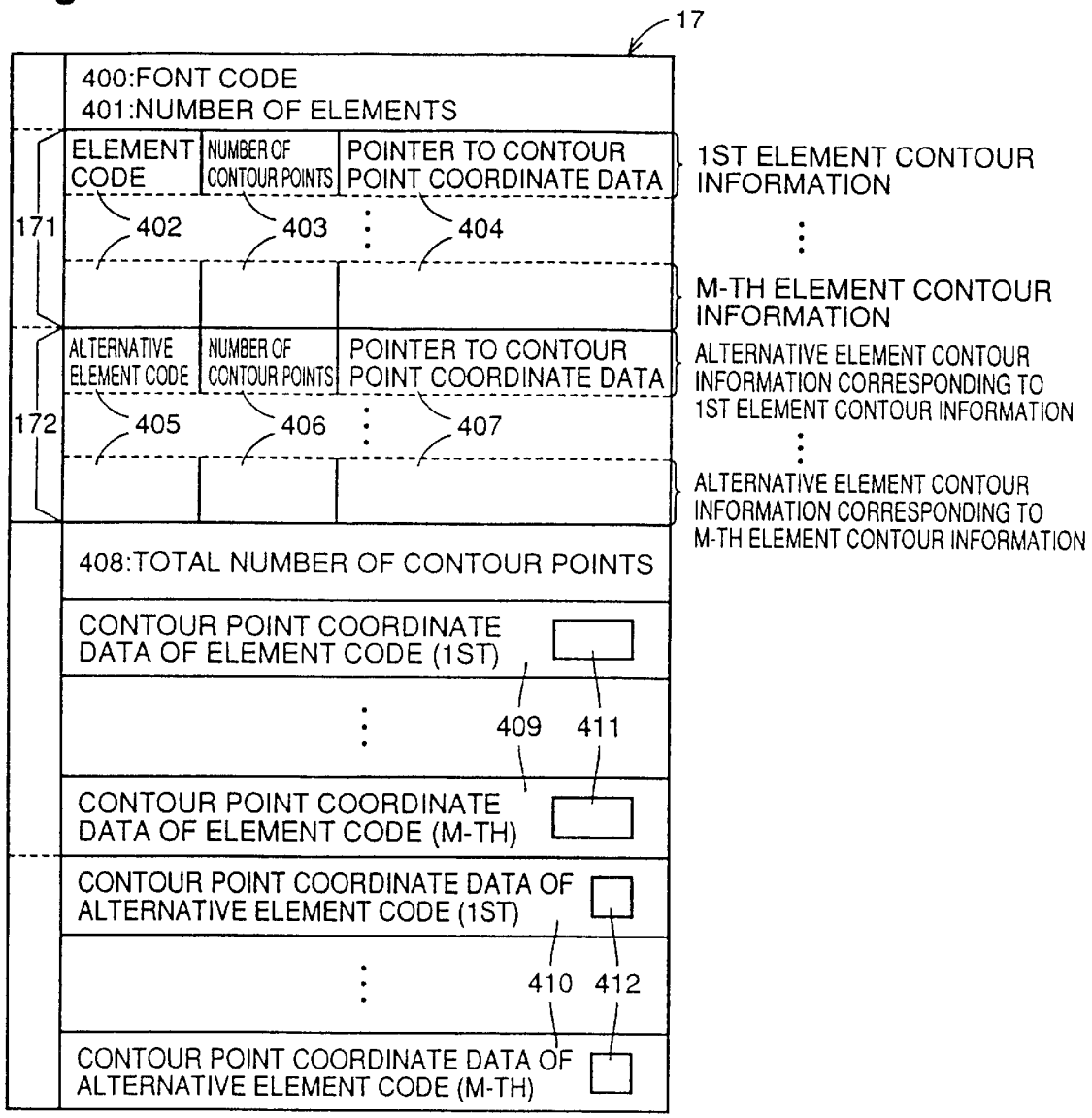
FIG. 4 shows an example of the stored content of element contour shape information in FIG. 1.

FIG. 4 shows an example of the stored content of element contour shape information 17. Element contour shape information 17 includes a font code 400 to identify the kind of a font, the number of elements prepared for the font 401, an element contour information group 171, an alternative element contour information group 172, the total number of contour points 408, the contour point coordinate data 409 of each element, and the contour point coordinate data 410 of each alternative element.

Element contour information group 171 includes element contour information as many pieces as the number of elements (M for example). Each element contour information is formed of an element code 402, the number of contour points forming the contour of an element of interest 403, and a pointer to contour point coordinate data 409 corresponding to the element of interest. Each information included in alternative element contour information group 172 is entirely identical to the element contour information, and formed of an alternative element code 405 in a one-to-one correspondence to element code 402, the number of contour points forming the contour of alternative element 406, and a pointer 407 to corresponding contour point coordinate data 410.

Figure 5:
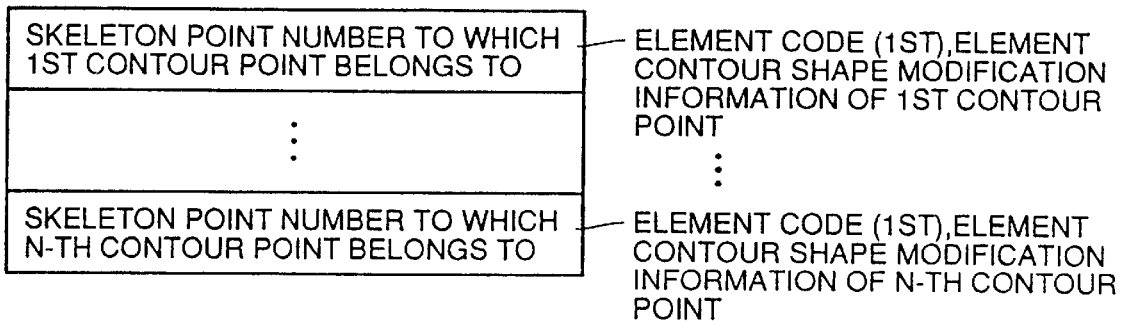
FIG. 5 shows an example of the stored content of element contour shape modification information in FIG. 4.
Figure 6:
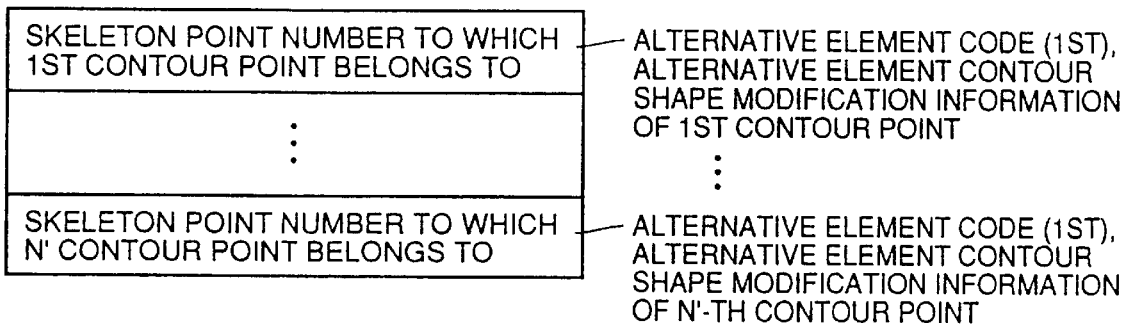
FIG. 6 shows an example of the stored content of alternative element contour shape modification information in FIG. 4.

The contour point coordinate data 409 of each element includes element contour shape information 411. FIG. 5 shows an example of the stored content of element contour shape modification information 411. Element contour shape modification information 411 indicates a correspondence between the contour points (N for example) of the element contour shape of the first element code and each skeleton point of the element skeleton form, and stores a skeleton point number to which each contour point belongs to. Element contour shape modification information 411 is similarly stored for other element codes. The contour point coordinate data 410 of alternative elements include alternative element contour shape modification information 412. FIG. 6 shows an example of the stored content of alternative element contour shape modification information 412. Alternative element contour shape modification information 412 indicates a correspondence between the contour points (N' for example) of the element contour shape of the first element code for example and each skeleton point of the element skeleton form, and stores a skeleton point number to which each contour point belongs to. Alternative element contour shape modification information 412 is similarly stored for other alternative element codes.

Figure 7A:
FIGS. 7A to 7C show examples of the geometric information of a single element in element contour shape information.
Figure 7B:
Figure 7C:

FIGS. 7A to 7C show an example of the geometric information of a single element in element contour shape information.

Figure 8:
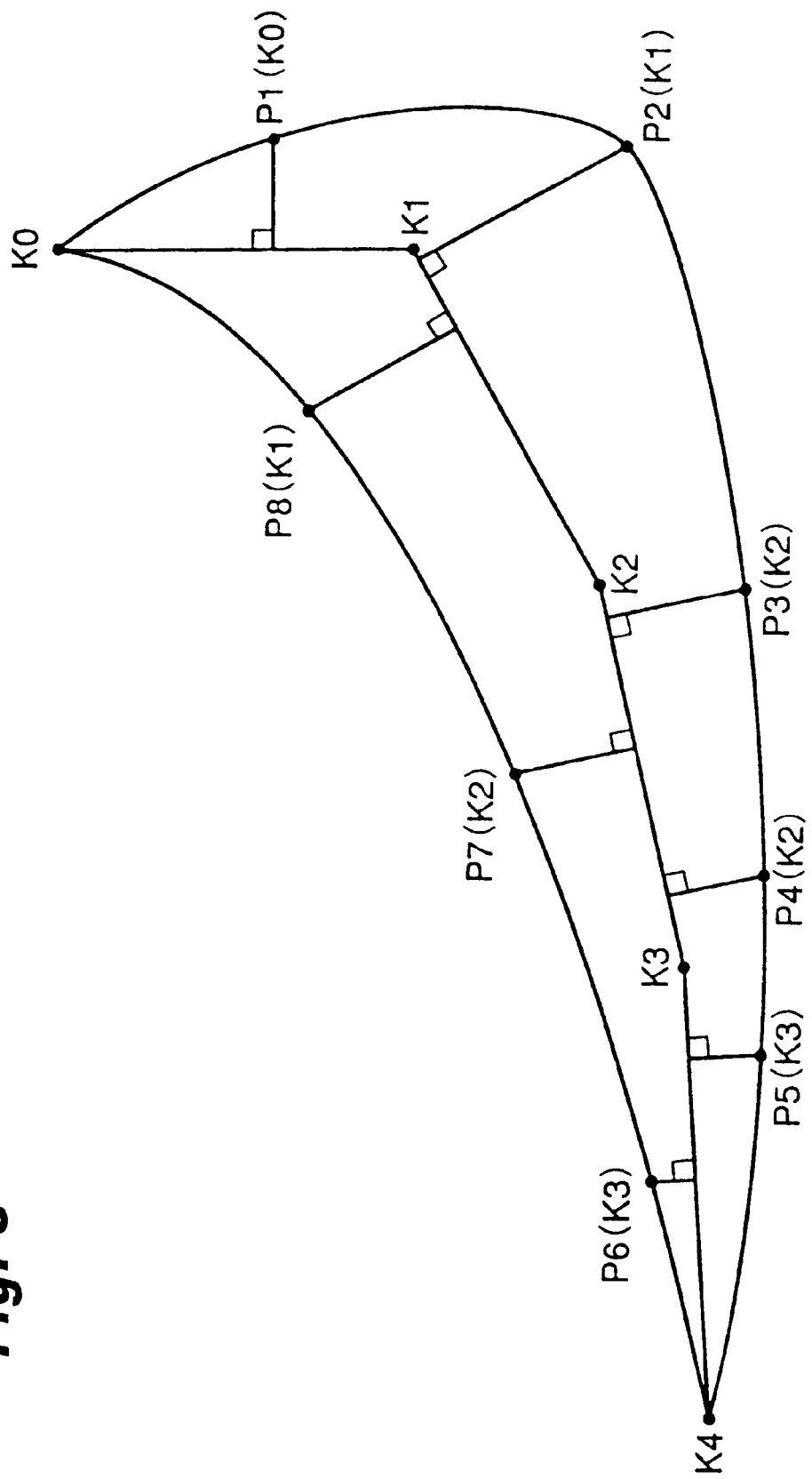
FIG. 8 shows how the contour points of an element contour shape and the skeleton points of an element skeleton form correspond to one another according to the embodiment of the invention.

The element contour shape modification information 411 of a single element (see FIG. 5), in other words, a correspondence between the contour points of an element contour shape and the skeleton points of an element skeleton form will be described. FIG. 8 shows a correspondence between the contour points of an element contour shape and the skeleton points of element skeleton form according to the embodiment of the invention. In FIG. 8, K0, K1, K2, K3 and K4 represent skeleton points which a certain element in element skeleton form information has, while points P1, P2, P3, P4, P5, P6, P7 and P8 represent contour points which the certain element in element contour shape information has.

Segments connecting skeleton points K0, K1, K2, K3 and K4 are labeled K0–K1, K1–K2, K2–K3, and K3–K4. From each of contour point P1, P2, P3, P4, P5, P6, P7 and P8, a segment reached at a minimum distance is produced. The skeleton point number of the starting point of the segment is a skeleton point number to which contour points corresponding to the segment belong to. Each skeleton point number thus produced is stored in element contour shape information 17 as element contour shape modification information 411.

Figure 9:
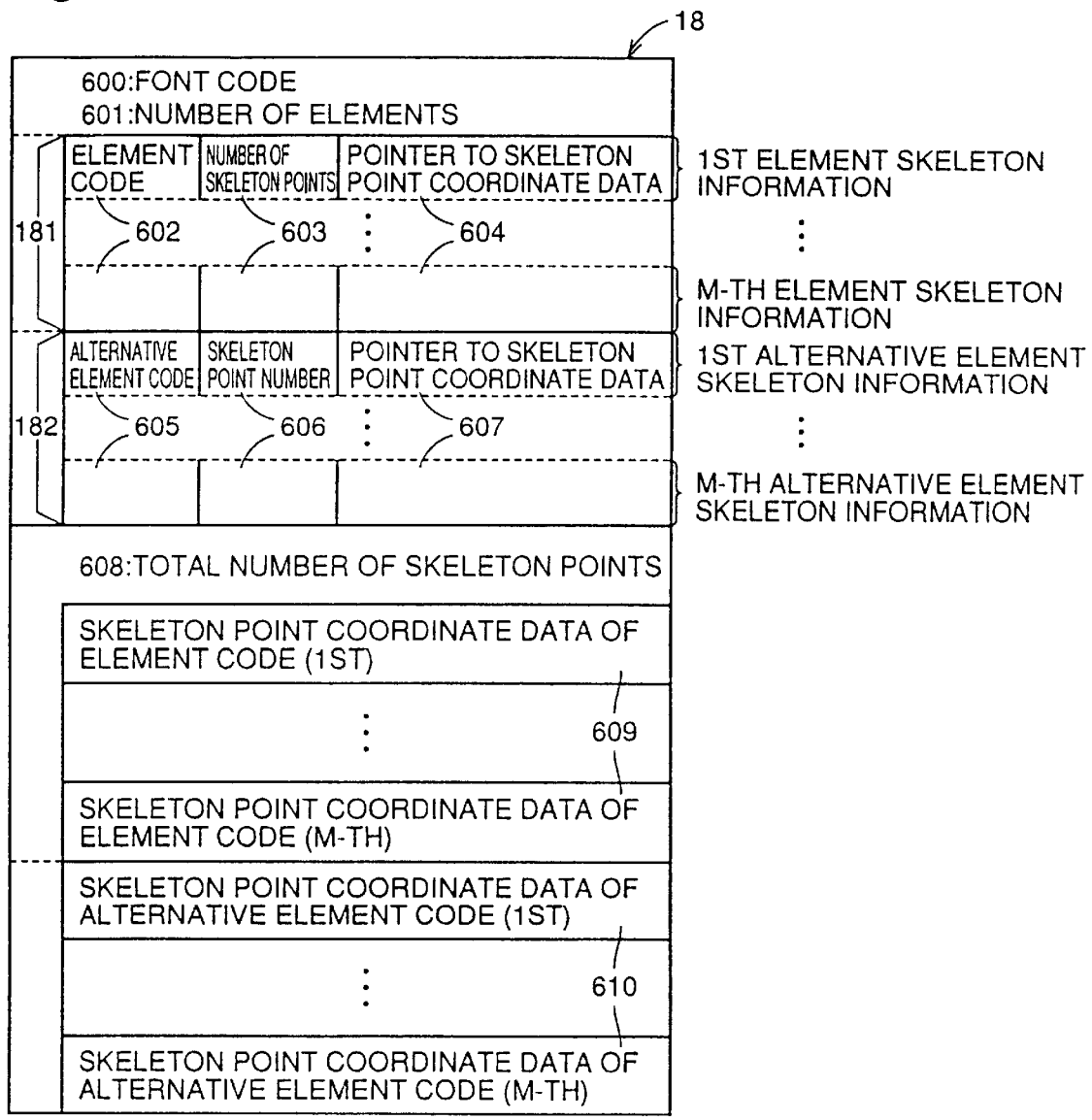
FIG. 9 shows an example of the stored content of element skeleton form information 18 in FIG. 1.

FIG. 9 shows an example of the stored content of element skeleton form information 18. Element skeleton form information 18 stores a font code 600 to identify a font, the number of elements prepared for the font 601 (M for example), an element skeleton information group 181 formed of element skeleton information for the M elements, an alternative element skeleton information group 182 formed of alternative element skeleton information for the M elements, the total number of skeleton points 608, the skeleton point coordinate data 609 of all the elements, and the skeleton point coordinate data 610 of all the alternative elements Each element skeleton information includes the element code 620 of a corresponding element, the number of skeleton points forming a skeleton 603, and a pointer 604 to corresponding skeleton point coordinate data 609. The structure of each alternative element skeleton information is entirely identical to the element skeleton information, and includes an alternative element code 605 in a one-to-one correspondence to element code 602, the number of skeleton points forming a skeleton 606, and a pointer 607 to corresponding skeleton point coordinate data 610.

Figure 10:
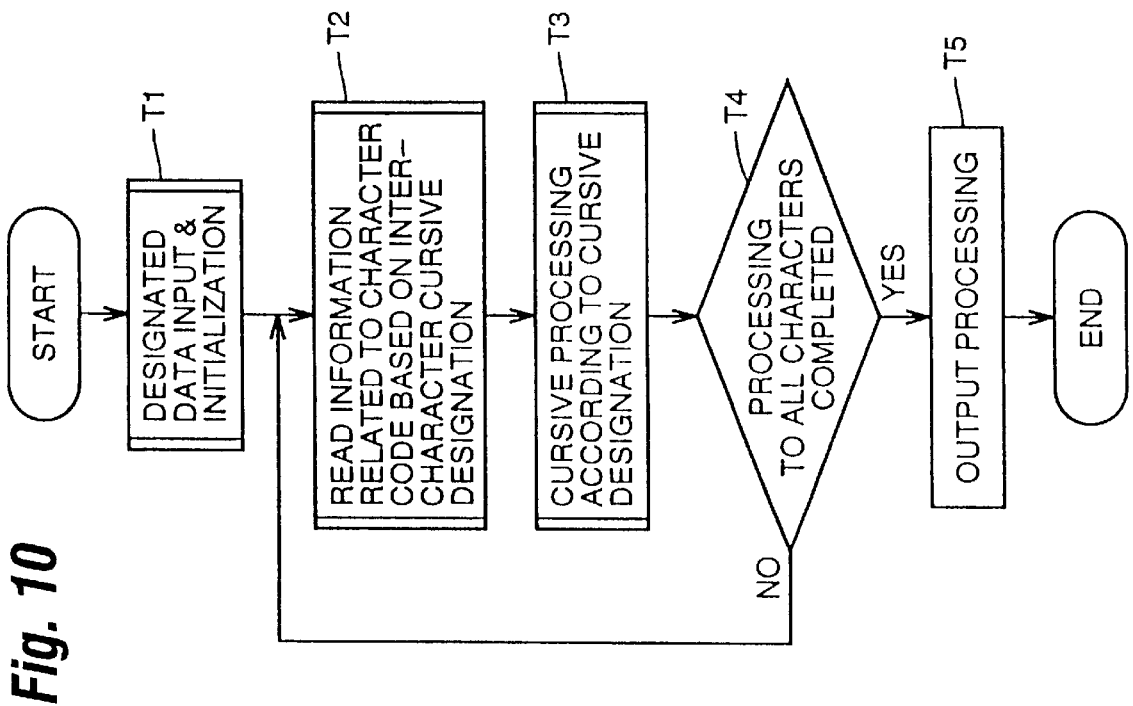
FIG. 10 is a main flow chart for use in illustration of a character pattern producing apparatus according to the embodiment of the invention.

Referring to FIG. 10, the main flow chart of the character pattern producing apparatus according to the embodiment of the invention includes designated data input and initialization T1, information reading T2 related to a character code based on a designation to connect characters, a cursive processing T3 based on the designation to connect characters, a determination of the end of processing all the characters T4 and an output processing T5.

Figure 11:
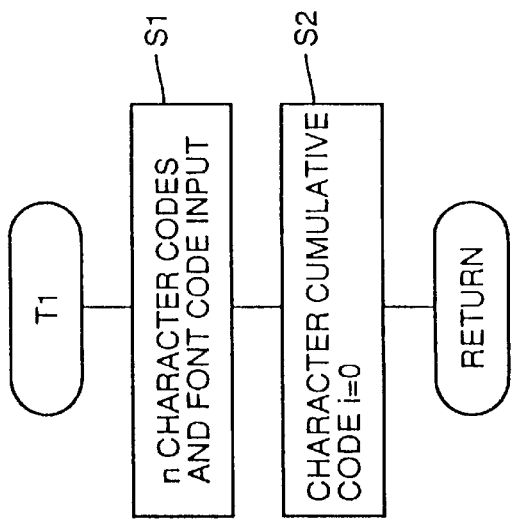
FIG. 11 is a flow chart for use in illustration of a designated data input and initialization shown in FIG. 10.

The character pattern producing apparatus as described-above operates as follows. During designated data input and initialization T1 in FIG. 11, the font code of a font to be produced or character codes for one or more characters are input from keyboard 10 (S1). CPU 12 sets a variable i for counting processed characters to 0 (S2). The control returns to the main flow chart after processing S2.

Figure 12:
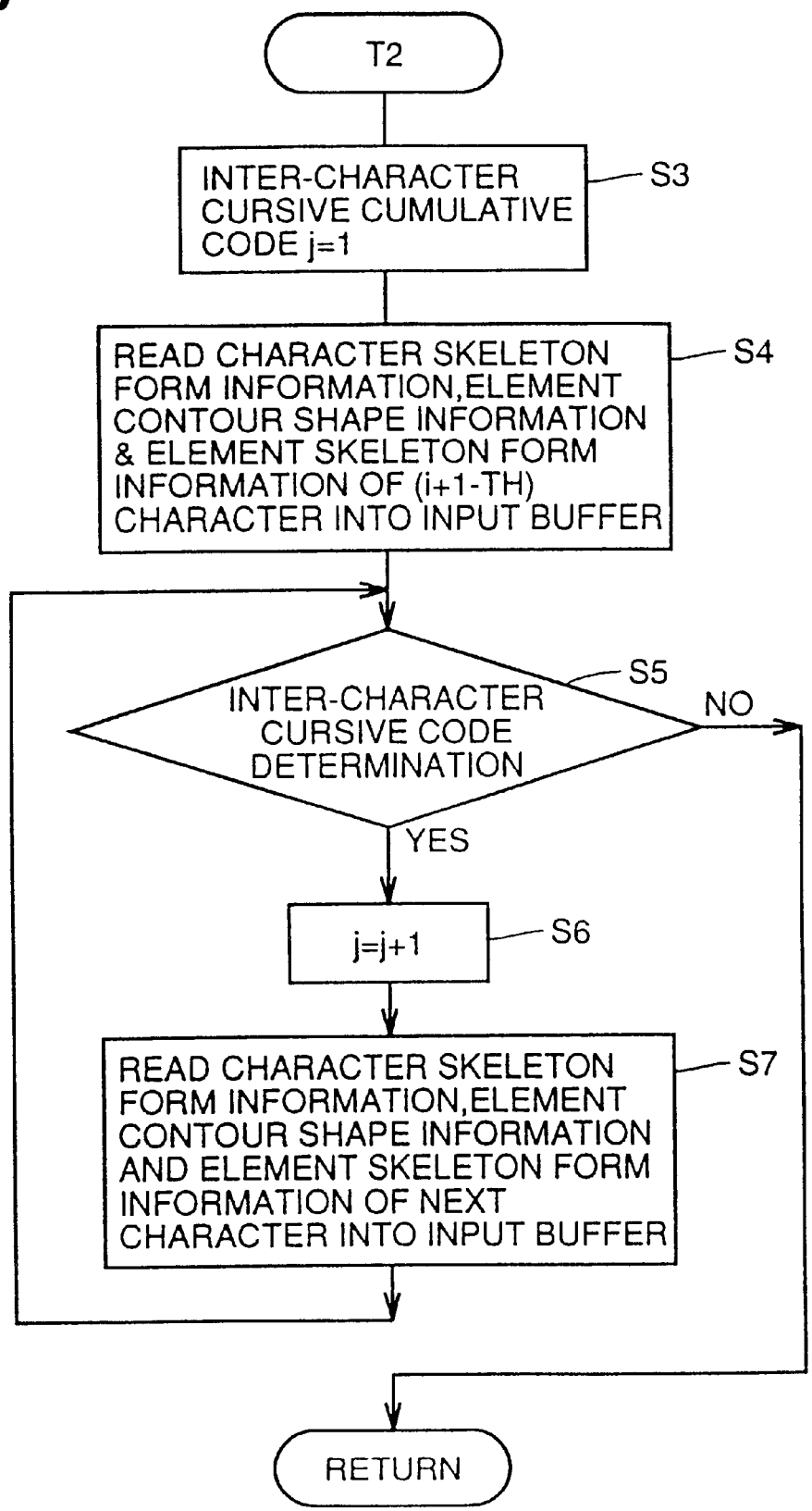
FIG. 12 is a flow chart for use in illustration of information reading related to a character code according to a inter-character cursive designation in FIG. 10.
Figure 13:
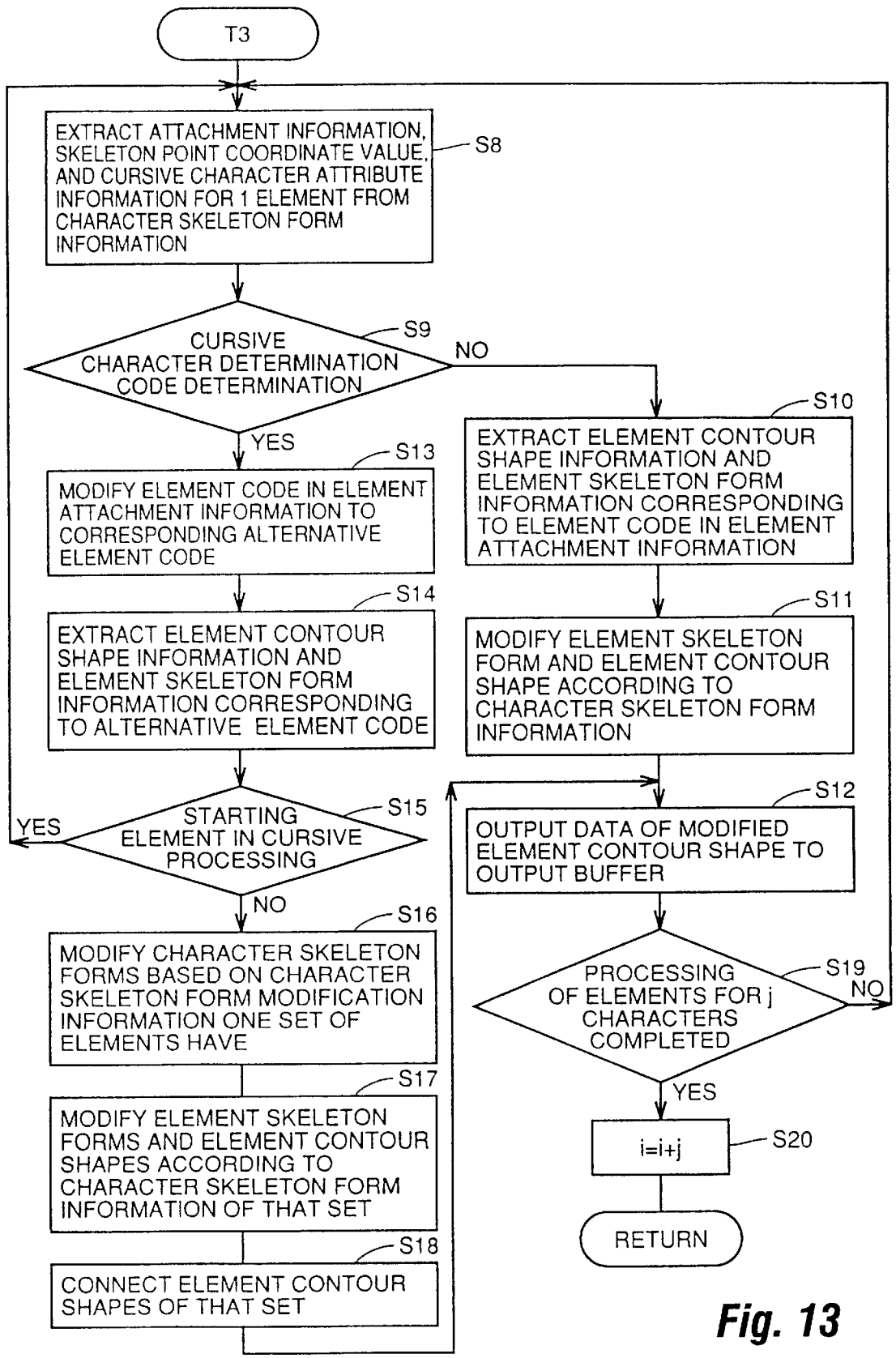
FIG. 13 is a flow chart for use in illustration of a cursive processing according to the cursive character designation in FIG. 10.

CPU 12 then sets a variable j for counting the number of characters to be subjected to an inter character cursive processing to 1 in step T2 in FIG. 12 (S3). CPU 12 reads corresponding character skeleton form information 16 to be used in a pattern producing processing based on the character code of the first character of the designated plurality of characters, in other words the character code of the i+1-th character element contour shape information 17 and element skeleton form information 18 corresponding to the designated font code into the input buffer of main memory 13 (S4).

CPU 12 then determines whether a cursive processing is performed only within that character or between a plurality of characters based on inter-character cursive character code 203 in character skeleton form information 16 read into the input buffer (S5). The control proceeds to step T3 if the processing is to be performed within a single character.

Meanwhile, if the processing is to be performed between characters, variable j is added with 1 (S6). The character skeleton form information 16 of the next one character, element contour shape information 17 corresponding to the designated font code, and element skeleton form information 18 corresponding to the designated font code are read into the input buffer of main memory 13 (S7), and the control returns to step S5. Thus, a plurality of pieces of character information can be treated as if they were a single piece of character information. Variable j is checked into to determine the timing for ending the cursive character processing between the plurality of characters.

Then, from character skeleton form information 16, the attachment information of one element corresponding to the designated font code, the cursive character attribute information, and the skeleton point coordinate data of the element are taken into the work memory in CPU 12 from the input buffer (S8).

Then, cursive character determination code 207 loaded in the work memory is checked, and whether or not to perform a cursive processing to the element is determined (S9). If the element is to be subjected to a cursive processing (YES in S9), the control proceeds to step S13 which will be described later, and otherwise CPU 12 takes into its work memory the contour point coordinate data 409 of the element corresponding to the element code 204 of that one element and skeleton point coordinate data 609 from element contour shape information 17 and element skeleton form information 18 which has been read into the input buffer (S10).

CPU 12 then matches the coordinate value of each skeleton point in element skeleton form information 17 loaded in step S10 with the value of skeleton point coordinate data corresponding to the element in character skeleton form information 16 loaded in the work memory in S8, using an approach such as expansion, reduction and rotation. At the time, segments K0–K1, K1–K2, K2–K3 and K3–K4 in element skeleton form information 17 which have been described in conjunction with FIG. 8 naturally move as well. CPU 12 moves contour points P1 to P8 in element contour shape information 17 corresponding to the movement of these segments (S11).

Figure 14:
FIG. 14 shows the movement of contour points according to the embodiment of the invention.

Now, the movement of contour points will be described. In FIG. 14, assume that segment K3–K4 has moved to segment K3'–K4'. Based on contour shape modification information 411, contour points P5 and P6 are to be moved (because K3 is the skeleton point number to which contour points P5 and P6 belong to). The conditions for the movement of contour points P5 and P6 are as follows.

(1) The intersecting points of perpendiculars from contour points P5 and P6 and segment K3–K4 are CP1 and CP2. The length of the segment between points K3 and CP1 is L1, the length between points CP1 and CP2 is L2, and the length between points CP2 and K4 is L3. Points CP1' and CP2' are produced on segment K3'–K4' so that segment K3'–K4' are divided into three segments by CP1' and CP2' in the same ratio in length as L1:L2:L3 (skeleton point K3' is in the same position as skeleton point K3.) Herein, the length of segment K3'–CP1' is L1', the length of segment CP1'–CP2' is L2', and the length of segment CP2'–K4' is L3'.

(2) The distances from segment K3–K4 to points P5 and P6 are D5 and D6. Points P5' and P6' are placed at distances D5 and D6 apart, respectively in the vertical direction with respect to segment K3'–K4' from points CP1' and CP2' produced in (1). These points correspond to points to which points P5 and P6 have moved.

More specifically, in FIG. 14, the conditions for the movement of points P5 and P6 are as follows.

(a) Ratio in length L1:L2:L3=L1':L2':L3'

(b) Distance D5=D5' and D6=D6'

A contour point moving processing which satisfies the conditions (a) and (b) can modify element contour shape information according to character skeleton form information 16. After the moving processing is completed for all the contour points of one element, contour points P1' to P7' after the movement are output to the output buffer of main memory 13 (S12).

If an element is determined to be subjected to a cursive character processing (YES in S9), the processing proceeds as follows. CPU 12 recognizes alternative element code 209 corresponding to element code 204 in element attachment information loaded in the work memory based on the correspondence between the element codes and the alternative element codes as shown in FIG. 9. In the character producing processing thereafter, alternative element code 209 will be used (S13).

Then, CPU 12 takes into its work memory the contour point coordinate data 410 and skeleton point coordinate data 610 of the element corresponding to alternative element code 209 from element contour shape information 17 and element skeleton form information 18 which have been read into the input buffer (S14).

Based on cursive character determination code 207 in the cursive attribute information loaded in the work memory, it is determined if the element is a starting element in a cursive processing (S15). If the element is a starting element (YES in S15), the control returns to step S8. More specifically, the element attachment information, and cursive character attribute information of the next element and the skeleton point coordinate data of the element are taken into the work memory from the input buffer. If the element is an ending element (NO in S15), the control proceeds to step S16.

As in the foregoing, the rule of order between the elements in character skeleton form information 16 requests that element attachment information belonging to a starting element and a corresponding ending element in a cursive processing, cursive character attribute information, and the skeleton point coordinate data of elements be stored in a continued manner. Therefore, at the point at which the processing has proceeded to step S16, element attachment information related to a set of elements to be processed, cursive character attribute information, and the skeleton point coordinate data of the elements have already been taken into the work memory in CPU 12.

CPU 12 modifies the skeleton forms of the elements in character skeleton form information 16 loaded in the work memory based on Bézier control point distance 208 in cursive character attribute information loaded in the work memory (S16).

Figure 15:
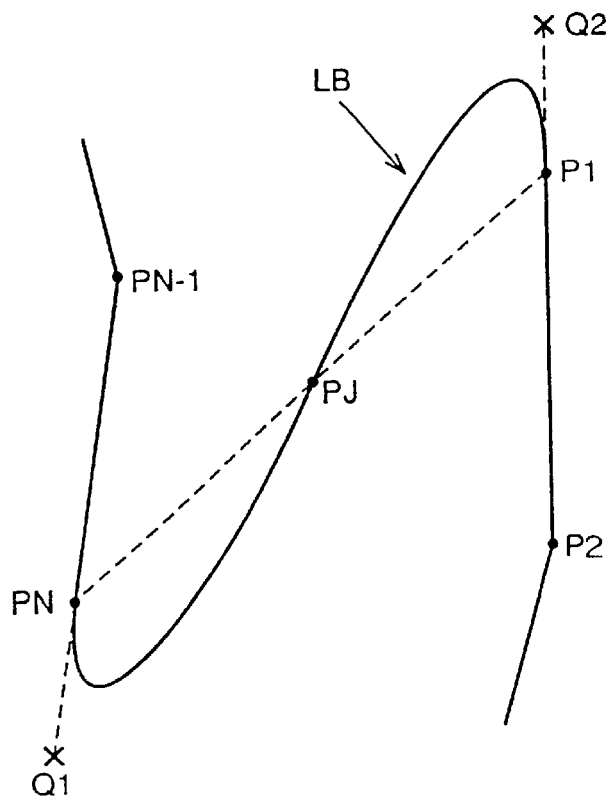
FIG. 15 shows a skeleton form modification processing according to the embodiment of the invention.

Referring to FIG. 15, the number of skeleton points a starting element has is N and the number of skeleton points an ending element has is M. Assume that segment PN-1__PN connects the N-1-th skeleton point of the starting element (point PN-1) and the N-th skeleton point (point PN). The control point Q1 of a Bézier curve is produced at coordinates apart from point PN by Bézier control point distance 208 on the prolongation of the segment. Then, assume that segment P2__P1 connects the second skeleton point of the ending element (point P2) and the first skeleton point (point P1). The control point Q2 of the Bézier curve is generated at coordinates apart from point P1 by Bézier control point distance 208 on the prolongation of the segment. Thus, a cubic Bézier curve (curve LB) having starting point PN, ending point P1, and control points Q1 and Q2 is produced.

The curve LB is approximated by two straight lines, and the connecting point of these two straight lines (point PJ) is produced. Then, the N skeleton points of the starting element are attached with point PJ as the N+1-th skeleton point. Thus obtained N+1 skeleton points are stored in the storing portion of main memory 13 as an already modified starting element whose skeleton form has been modified. Similarly, point PJ is added to the M skeleton points of the ending element as the first skeleton point. Thus obtained M+1 skeleton points are stored in the storing portion of main memory 13 as an already modified ending element whose skeleton form has been modified.

Figure 16:
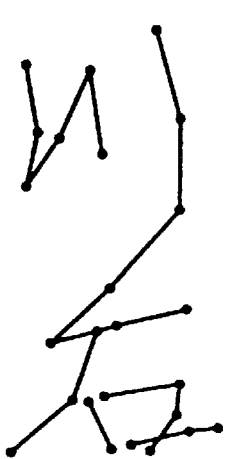
FIG. 16 shows an example of geometric information after the skeleton form modification of the character skeleton form information shown in FIG. 3.

FIG. 16 shows an example of the geometric information of the character skeleton form information shown in FIG. 3 after its skeleton form has been modified.

CPU 12 then matches the coordinate value of each skeleton point of element skeleton form information 18 corresponding to the starting element which has been loaded in step S14 with the skeleton point coordinate data of the already modified starting element as described above, using an approach such as expansion, reduction, and rotation. CPU 12 further moves the contour points in the element contour shape information corresponding to the movement of skeleton point coordinates.

Similarly, CPU 12 matches the coordinate value of each skeleton point in element skeleton form information 18 corresponding to the ending element with the coordinate data of the skeleton points of the already modified starting element as described above, using an approach such as expansion, reduction and rotation. CPU 12 moves the contour points of element contour shape information 17 in association with movement (S17). The conditions for the movement of contour points have been already described in conjunction with FIG. 14, and therefore will not be repeated here.

Figure 17:
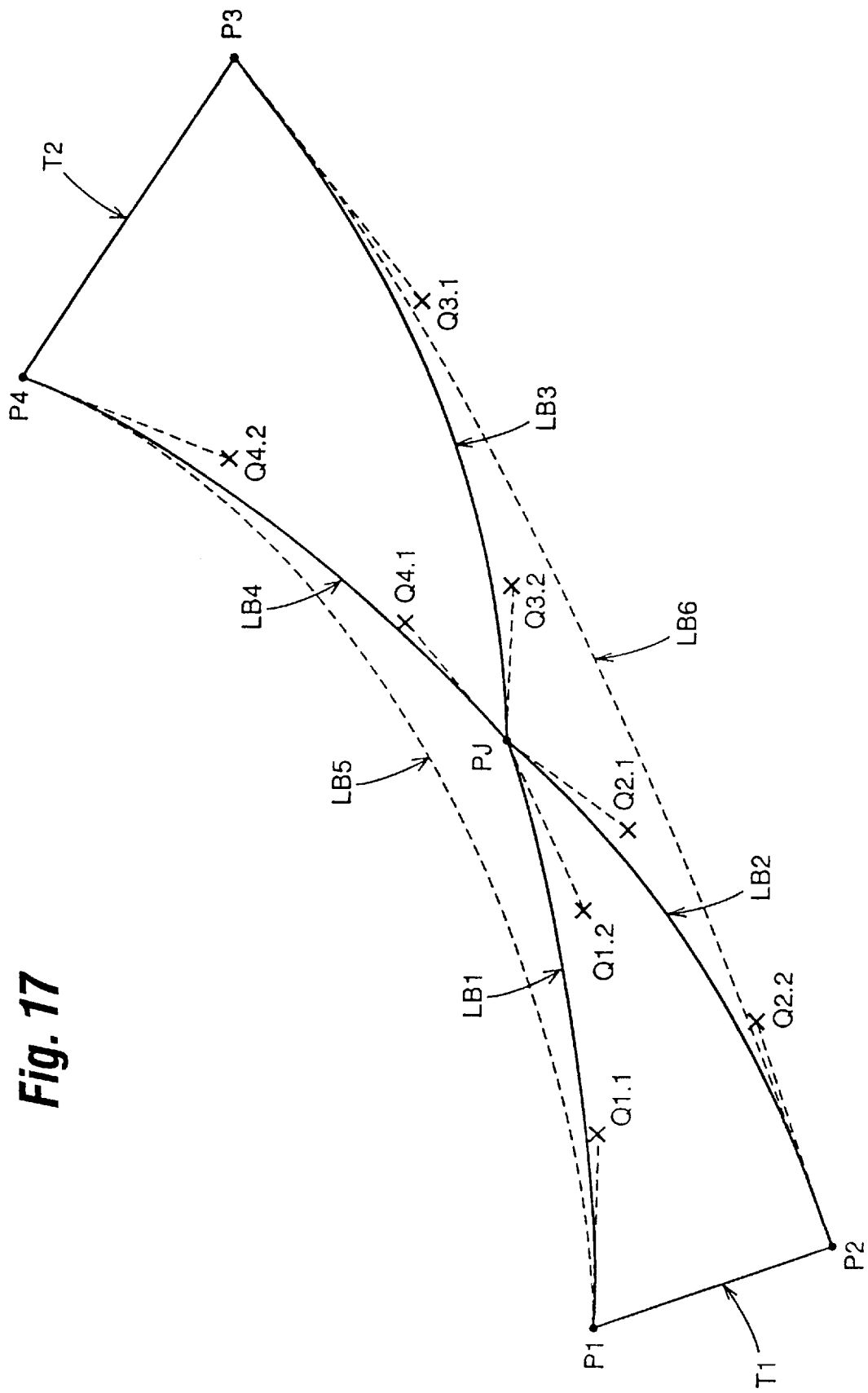
FIG. 17 shows a connecting processing of contour points according to the embodiment of the invention.

CPU 12 then connects contour points related to the already modified starting element and contour points related to the already modified ending element (S18). Referring to FIG. 17, the contour points related to the modified starting element are points P1, Q1.2, PJ, Q2.1, Q2.2, and P2. Points P1, Q1.1, Q1.2, and PJ are used to form a cubic Bézier curve LB1, and points PJ, Q2.1, Q2.2 and P2 are used to form a cubic Bézier curve LB2.

The contour points related to the already modified ending element are points P3, Q3.1, Q3.2, PJ, Q4.1, Q4.2, and P4. Points P3, Q3.1, Q3.2, and PJ are used to form a cubic Bézier curve LB3, and points BJ, Q4.1, Q4.2, and P4 are used to form a cubic Bézier curve LB4. The contour of the already modified starting element is formed of curves LB1 and LB2 and straight line T1 connecting points P1 and P2. The contour of the modified ending element is formed of curves LB3 and LB4 and straight line T2 connecting points P3 and P4.

Another cubic Bézier curve LB5 is defined by points P1, Q1.1, Q4.2, and P4, and yet another cubic Bézier curve LB6 is defined by points P3, Q3.1, Q2.2 and P2. A connected contour is formed by a single contour by curves LB5 and LB6 and straight lines T1 and T2. More specifically, the connection of contour points is achieved by extracting contour points necessary for forming a single contour among the contour points of two elements.

Figure 18:
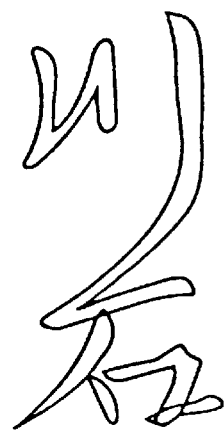
FIG. 18 shows an example of geometric information after the element contour shape information has been modified and connected according to the skeleton form of character skeleton form information shown in FIG. 16.

After the contour points necessary for connection are extracted from the set of elements, the extracted contour points P1, Q1.1, Q4.2, P4, P3, Q3.1, Q2.2, and P2 are output to the output buffer of main memory 13 (S12). FIG. 18 shows an example of the geometric information after the modification and connection of element contour shape information corresponding to the skeleton forms of character skeleton form information in FIG. 16.

CPU then determines whether the processing has been performed to all the elements of j characters (S19). If the processing has been completed (YES in S19), variable i is added with the value of variable j (S20). If the processing has not been completed (NO in S19), the control returns to step S8, and the element attachment information and cursive character attribute information of a next element and the skeleton point coordinate data of a element are loaded to the work memory from the input buffer.

Then, CPU 12 determines whether or not the processing has been performed to all the characters (T4 in FIG. 10). If the processing has been completed (YES in T4), CPU transfers the data within the output buffer in main memory 13 to bit map memory 14, thus completing the processing (T5). If the processing has not been completed (NO in T4), the control returns to step S3, and variable j is once again set to 1 in order to count the number of characters to be subjected to an inter-character cursive processing.

The contour point data transferred to bit map memory 14 is developed into bit map data, printed and output by output device 15 (T5).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A character pattern producing apparatus for producing a character pattern of a designated font for a character formed of one or more elements, comprising:

a storing device prestoring character skeleton form information prepared for each character code, element contour shape information prepared for each font and for each element used in the font, and element skeleton form information prepared for each font and for each element used in the font, said character skeleton form information indicating a skeleton form shared between a plurality of fonts for all the elements of a corresponding character, said element contour shape indicating the contour shapes of said elements, said element skeleton form information indicating the skeleton form of a corresponding element;

an input device;

a determination portion for determining whether or not said elements corresponding to a prescribed font and a character code input through said input device are to be subjected to a cursive processing with another element;

a first modification portion responsive to a determination by said determination portion to perform a cursive processing for modifying information indicating the skeleton forms of a set of said elements to be subjected to said cursive processing corresponding to said prescribed font into a processable form;

a second modification portion for modifying said element skeleton form information of said set of elements based on said information indicating the modified skeleton forms;

a third modification portion for modifying said element contour shape information of said set of elements based on said modified element skeleton form information;

a connection portion connecting said contour shapes of said set of elements based on said modified element contour shape information; and a pattern producing portion for producing said pattern, using said element contour shape information corresponding to said connected contour shapes.

2. The character pattern producing apparatus as recited in claim 1, wherein said character skeleton form information includes cursive character determination information indicating whether or not a corresponding element is to be subjected to said cursive processing and cursive character attribute information necessary for modifying said skeleton forms.

3. The character pattern producing apparatus as recited in claim 1, wherein in said character skeleton form information, the information of one element and another element in said set of elements in said cursive processing are sequentially stored.

4. The character pattern producing apparatus as recited in claim 1, wherein said element contour shape information includes contour shape modification information necessary for modifying element contour shapes.

5. The character pattern producing apparatus as recited in claim 4, further comprising:

a fourth modification portion responsive to a determination by said determination portion not to perform a cursive processing for modifying a corresponding piece of said element skeleton form information based on said character skeleton form information of said elements;

a fifth modification portion for modifying a corresponding piece of said element contour shape information based on the element skeleton form information modified by said fourth modification portion; and a first pattern producing portion for producing said character pattern, using said element contour shape information modified by said fifth modification portion.

6. The character pattern producing apparatus as recited in claim 3, further comprising:

a fourth modification portion responsive to a determination by said determination portion not to perform a cursive processing for modifying a corresponding piece of said element skeleton form information based on said character skeleton form information of said elements;

a fifth modification portion for modifying a corresponding piece of said element contour shape information based on the element skeleton form information modified by said fourth modification portion; and a first pattern producing portion for producing said character pattern, using said element contour shape information modified by said fifth modification portion.

7. The character pattern producing apparatus as recited in claim 2, wherein
said element contour shape information includes contour shape modification information necessary for modifying an element contour shape.

8. The character pattern producing apparatus as recited in claim 7, further comprising:
a fourth modification portion responsive to a determination by said determination portion not to perform a cursive processing for modifying a corresponding piece of said element skeleton form information based on said character skeleton form information of said elements;

a fifth modification portion for modifying a corresponding piece of said element contour shape information based on the element skeleton form information modified by said fourth modification portion; and a first pattern producing portion for producing said character pattern, using said element contour shape information modified by said fifth modification portion.

9. The character pattern producing apparatus as recited in claim 2, further comprising:
a fourth modification portion responsive to a determination by said determination portion not to perform a cursive processing for modifying a corresponding piece of said element skeleton form information based on said character skeleton form information of said elements;

a fifth modification portion for modifying a corresponding piece of said element contour shape information based on the element skeleton form information modified by said fourth modification portion; and a first pattern producing portion for producing said character pattern, using said element contour shape information modified by said fifth modification portion.

10. The character pattern producing apparatus as recited in claim 1, wherein
in said character skeleton form information, one element and another element of said set of elements in said cursive processing are sequentially stored.

11. The character pattern producing apparatus as recited in claim 10, wherein
said element contour shape information includes contour shape modification information necessary for modifying the element contour shapes.

12. The character pattern producing apparatus as recited in claim 11, further comprising:
a fourth modification portion responsive to a determination by said determination portion not to perform a cursive processing for modifying a corresponding piece of said element skeleton form information based on said character skeleton form information of said elements;

a fifth modification portion for modifying a corresponding piece of said element contour shape information based on the element skeleton form information modified by said fourth modification portion; and a first pattern producing portion for producing said character pattern, using said element contour shape information modified by said fifth modification portion.

13. The character pattern producing apparatus as recited in claim 10, further comprising:
a fourth modification portion responsive to a determination by said determination portion not to perform a cursive processing for modifying a corresponding piece of said element skeleton form information based on said character skeleton form information of said elements;

a fifth modification portion for modifying a corresponding piece of said element contour shape information based on the element skeleton form information modified by said fourth modification portion; and a first pattern producing portion for producing said character pattern, using said element contour shape information modified by said fifth modification portion.

14. The character pattern producing apparatus as recited in claim 1, wherein
said element contour shape information includes contour shape modification information necessary for modifying the element contour shapes.

15. The character pattern producing apparatus as recited in claim 14, further comprising:
a fourth modification portion responsive to a determination by said determination portion not to perform a cursive processing for modifying a corresponding piece of said element skeleton form information based on said character skeleton form information of said elements;

a fifth modification portion for modifying a corresponding piece of said element contour shape information based on the element skeleton form information modified by said fourth modification portion; and a first pattern producing portion for producing said character pattern, using said element contour shape information modified by said fifth modification portion.

16. The character pattern producing apparatus as recited in claim 1, further comprising a fourth modification portion responsive to a determination by said determination portion not to perform a cursive processing for modifying a corresponding piece. of said element skeleton form information based on said character skeleton form information of said elements;

a fifth modification portion for modifying a corresponding piece of said element contour shape information based on the element skeleton form information modified by said fourth modification portion; and a first pattern producing portion for producing said character pattern, using said element contour shape information modified by said fifth modification portion.

17. A recording medium recording a program for implementing a character pattern producing method by a computer including an input device, and a storing device pre-storing character skeleton form information prepared for each character code, element contour shape information prepared for each font and for each element used in the font, and element skeleton form information prepared for each font and for each element used in the font, said character skeleton form information indicating a skeleton form shared between a plurality of fonts for all the elements of a corresponding character, said element contour shape information indicating the contour shapes of said elements, and said element skeleton form information indicating the skeleton form of a corresponding element, said character pattern producing method comprising the steps of:

determining whether or not said elements corresponding to a prescribed font and a character code input through said input device are to be subjected to a cursive processing with another element;

a first modification step responsive to a determination in said determination step to perform a cursive processing for modifying information indicating the skeleton forms of the set of said elements to be subjected to said cursive processing corresponding to said prescribed font into a form possible for cursive processing;

a second modification step of modifying said element skeleton form information of said set of elements based on said information indicating modified skeleton forms;

a third modification step of modifying said element contour shape information of said set of elements based on said modified element skeleton form information;

connecting said contour shapes of said set of elements based on said modified element contour shape information; and producing said character pattern, using said element contour shape information corresponding to said connected contour shapes.

* * * * *